United States Patent
Liu et al.

(10) Patent No.: US 9,574,441 B2
(45) Date of Patent: Feb. 21, 2017

(54) DOWNHOLE TELEMETRY SIGNAL MODULATION USING PRESSURE PULSES OF MULTIPLE PULSE HEIGHTS

(71) Applicant: Evolution Engineering Inc., Calgary (CA)

(72) Inventors: Jili Liu, Calgary (CA); Mingdong Xu, Calgary (CA); David A. Switzer, Calgary (CA); Aaron W. Logan, Calgary (CA)

(73) Assignee: Evolution Engineering Inc., Calgary (CA)

( * ) Notice: Subject to any disclaimer, the term of this patent is extended or adjusted under 35 U.S.C. 154(b) by 49 days.

(21) Appl. No.: 14/653,229

(22) PCT Filed: Dec. 13, 2013

(86) PCT No.: PCT/CA2013/050966
§ 371 (c)(1),
(2) Date: Jun. 17, 2015

(87) PCT Pub. No.: WO2014/094150
PCT Pub. Date: Jun. 26, 2014

(65) Prior Publication Data
US 2015/0330217 A1    Nov. 19, 2015

Related U.S. Application Data

(60) Provisional application No. 61/738,296, filed on Dec. 17, 2012.

(51) Int. Cl.
*H04L 27/04*     (2006.01)
*E21B 47/18*     (2012.01)
(Continued)

(52) U.S. Cl.
CPC ............. *E21B 47/187* (2013.01); *H04B 11/00* (2013.01); *H04B 13/02* (2013.01); *H04L 27/04* (2013.01); *H04L 27/34* (2013.01)

(58) Field of Classification Search
CPC ....... E21B 47/187; H04B 11/00; H04B 13/02; H04L 27/04; H04L 27/34
(Continued)

(56) References Cited

U.S. PATENT DOCUMENTS

| 3,302,457 A | 2/1967 | Mayes |
| 3,309,656 A | 3/1967 | Godbey |

(Continued)

FOREIGN PATENT DOCUMENTS

| CA | 1 228 909 A | 11/1987 |
| CA | 1 229 998 A | 12/1987 |

(Continued)

*Primary Examiner* — Qutbuddin Ghulamali
(74) *Attorney, Agent, or Firm* — Seed Intellectual Property Law Group LLP

(57) ABSTRACT

A method for modulating a downhole telemetry signal uses a fluid pressure pulse generator that generates pressure pulses of multiple pulse heights in a drilling fluid. The method comprises: converting measurement data into a bitstream comprising symbols of a selected symbol set; encoding the bitstream into a pressure pulse telemetry signal using a modulation technique that includes amplitude shift keying, wherein each symbol of the selected symbol set is assigned a pressure pulse having a unique amplitude; and generating pressure pulses in the drilling fluid corresponding to the telemetry signal. Alternatively, the method can comprise a modulation technique that includes amplitude shift keying and phase shift keying and wherein each symbol of the selected symbol set is assigned a pressure pulse having a unique combination of amplitude and phase.

17 Claims, 14 Drawing Sheets

(51) Int. Cl.
*H04B 11/00* (2006.01)
*H04B 13/02* (2006.01)
*H04L 27/34* (2006.01)

(58) Field of Classification Search
USPC .......................................................... 367/83
See application file for complete search history.

(56) References Cited

U.S. PATENT DOCUMENTS

| | | | |
|---|---|---|---|
| 3,764,968 A | 10/1973 | Anderson | |
| 3,958,217 A | 5/1976 | Spinnler | |
| 3,982,224 A | 9/1976 | Patton | |
| 4,351,037 A | 9/1982 | Scherbatskoy | |
| 4,641,289 A | 2/1987 | Jürgens | |
| 4,734,892 A | 3/1988 | Kotlyar | |
| 4,771,408 A | 9/1988 | Kotlyar | |
| 4,785,300 A | 11/1988 | Chin et al. | |
| 4,830,122 A | 5/1989 | Walter | |
| 4,847,815 A | 7/1989 | Malone | |
| 4,914,637 A | 4/1990 | Goodsman | |
| 4,953,595 A | 9/1990 | Kotlyar | |
| 4,979,577 A | 12/1990 | Walter | |
| 5,073,877 A | 12/1991 | Jeter | |
| 5,079,750 A | 1/1992 | Scherbatskoy | |
| 5,182,730 A | 1/1993 | Scherbatskoy | |
| 5,182,731 A | 1/1993 | Hoelscher et al. | |
| 5,215,152 A | 6/1993 | Duckworth | |
| 5,237,540 A | 8/1993 | Malone | |
| 5,249,161 A | 9/1993 | Jones et al. | |
| 5,316,610 A | 5/1994 | Tamaki et al. | |
| 5,396,965 A | 3/1995 | Hall et al. | |
| 5,583,827 A | 12/1996 | Chin | |
| 5,586,083 A | 12/1996 | Chin et al. | |
| 5,586,084 A | 12/1996 | Barron et al. | |
| 5,636,178 A | 6/1997 | Ritter | |
| 5,740,126 A | 4/1998 | Chin et al. | |
| 5,740,127 A | 4/1998 | Van Steenwyk et al. | |
| 5,787,052 A | 7/1998 | Gardner et al. | |
| 5,950,736 A | 9/1999 | Goldstein | |
| 6,016,288 A | 1/2000 | Frith | |
| 6,219,301 B1 | 4/2001 | Moriarty | |
| 6,414,905 B1 | 7/2002 | Owens et al. | |
| 6,469,637 B1 | 10/2002 | Seyler et al. | |
| 6,626,253 B2 | 9/2003 | Hahn et al. | |
| 6,714,138 B1 | 3/2004 | Turner et al. | |
| 6,750,783 B2 | 6/2004 | Rodney | |
| 6,850,463 B2 | 2/2005 | Winnacker | |
| 6,867,706 B2 | 3/2005 | Collette | |
| 6,898,150 B2 | 5/2005 | Hahn et al. | |
| 6,970,398 B2 | 11/2005 | Lavrut et al. | |
| 6,975,244 B2 | 12/2005 | Hahn et al. | |
| 7,138,929 B2 | 11/2006 | Jeffryes et al. | |
| 7,145,834 B1 | 12/2006 | Jeter | |
| 7,180,826 B2 | 2/2007 | Kusko et al. | |
| 7,230,880 B2 | 6/2007 | Lehr | |
| 7,250,873 B2 | 7/2007 | Hahn et al. | |
| 7,280,432 B2 | 10/2007 | Hahn et al. | |
| 7,319,638 B2 | 1/2008 | Collette | |
| 7,327,634 B2 | 2/2008 | Perry et al. | |
| 7,330,397 B2 | 2/2008 | Ganesan et al. | |
| 7,367,229 B2 | 5/2008 | Engström | |
| 7,400,262 B2 | 7/2008 | Chemali et al. | |
| 7,405,998 B2 | 7/2008 | Webb et al. | |
| 7,417,920 B2 | 8/2008 | Hahn et al. | |
| 7,468,679 B2 | 12/2008 | Feluch | |
| 7,552,761 B2 | 6/2009 | Moriarty | |
| 7,564,741 B2 | 7/2009 | Pratt et al. | |
| RE40,944 E * | 10/2009 | Seyler | E21B 47/187 181/102 |
| 7,719,439 B2 | 5/2010 | Pratt et al. | |
| 7,735,579 B2 | 6/2010 | Gopalan et al. | |
| 7,808,859 B2 * | 10/2010 | Hahn | E21B 47/18 175/48 |
| 7,839,719 B2 | 11/2010 | Dopf et al. | |
| 7,881,155 B2 | 2/2011 | Close | |
| 8,151,905 B2 * | 4/2012 | Song | E21B 47/182 175/40 |
| 8,174,929 B2 | 5/2012 | Camwell et al. | |
| 8,203,908 B2 | 6/2012 | Pratt et al. | |
| 8,251,160 B2 | 8/2012 | Gopalan et al. | |
| 8,350,715 B2 * | 1/2013 | Shearer | E21B 47/18 340/853.1 |
| 2008/0074948 A1 * | 3/2008 | Reckmann | E21B 47/18 367/81 |
| 2009/0038851 A1 | 2/2009 | Camwell et al. | |
| 2009/0280912 A1 | 11/2009 | Buchanan et al. | |
| 2010/0188253 A1 * | 7/2010 | Shearer | E21B 47/18 340/853.3 |
| 2010/0212963 A1 | 8/2010 | Gopalan et al. | |
| 2011/0005835 A1 * | 1/2011 | Li | E21B 47/182 175/48 |
| 2012/0085583 A1 | 4/2012 | Logan et al. | |
| 2012/0127829 A1 | 5/2012 | Sitka | |
| 2012/0195442 A1 | 8/2012 | Villemoes et al. | |
| 2013/0154845 A1 * | 6/2013 | Brooks | E21B 47/18 340/854.3 |

FOREIGN PATENT DOCUMENTS

| | | |
|---|---|---|
| CA | 2 506 808 A1 | 7/2004 |
| CA | 2 551 316 C | 1/2012 |
| CA | 2 855 940 A1 | 6/2013 |
| GB | 2457175 B | 5/2011 |
| WO | 94/05893 A1 | 3/1994 |
| WO | 2005/084281 A2 | 9/2005 |
| WO | 2006/130606 A2 | 12/2006 |
| WO | 2007/033126 A2 | 3/2007 |
| WO | 2009/033146 A2 | 3/2009 |
| WO | 2010/138961 A2 | 12/2010 |
| WO | 2012/027245 A1 | 3/2012 |
| WO | 2012/027633 A2 | 3/2012 |
| WO | 2012/130936 A1 | 10/2012 |
| WO | 2012/145637 A2 | 10/2012 |
| WO | 2014/071514 A1 | 5/2014 |

\* cited by examiner

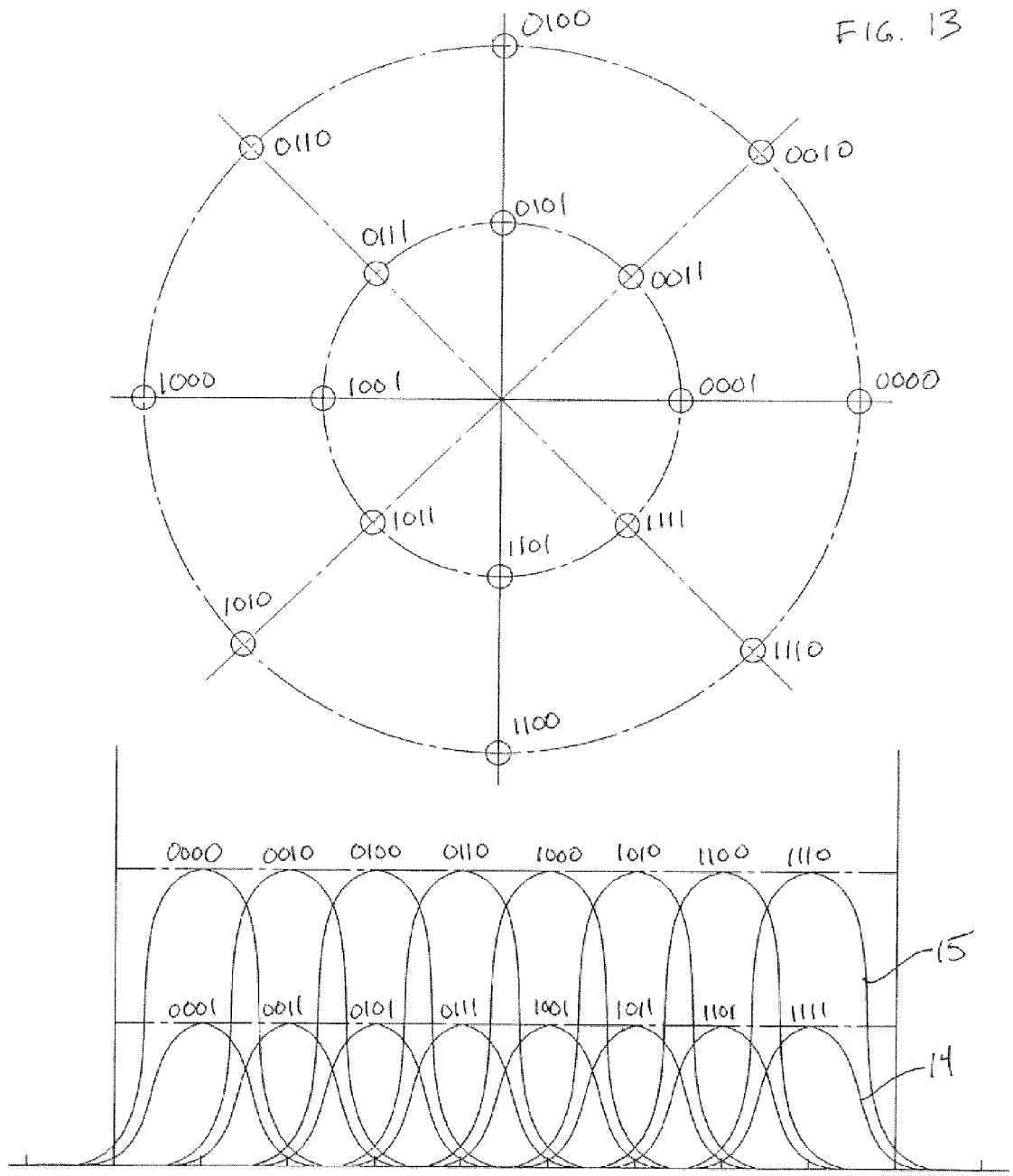

DOWNHOLE TELEMETRY SIGNAL MODULATION USING PRESSURE PULSES OF MULTIPLE PULSE HEIGHTS

FIELD OF THE INVENTION

This disclosure relates generally to downhole telemetry signal modulation using pressure pulses of multiple pulse heights and in particular to modulating a downhole telemetry signal using a fluid pressure pulse generator that generates pressure pulses of multiple pulse heights in a drilling fluid.

BACKGROUND

The recovery of hydrocarbons from subterranean zones relies on the process of drilling wellbores. The process includes drilling equipment situated at surface and a drill string extending from the surface equipment to the formation or subterranean zone of interest. The drill string can extend thousands of feet or meters below the surface. The terminal end of the drill string includes a drill bit for drilling (or extending) the wellbore. In addition to the conventional drilling equipment mentioned, the system also relies on some sort of drilling fluid system, in most cases a drilling fluid or "mud" which is pumped through the inside of the pipe, which cools and lubricates the drill bit and then exits out of the drill bit and carries the rock cuttings back to surface. The mud also helps control bottom hole pressure and prevent hydrocarbon influx from the formation into the wellbore which can potentially cause a blow out at surface.

Directional drilling is the process of steering a well away from vertical to intersect a target endpoint or follow a prescribed path. At the terminal end of the drill string is the bottom-hole-assembly (or BHA) which comprises of 1) drill bit; 2) steerable downhole mud motor of rotary steerable system; 3) sensors of survey equipment (Logging While Drilling (LWD) and/or Measurement-while-drilling (MWD)) to evaluate downhole conditions as drilling progresses; 4) equipment for telemetry of data to surface; and 5) other control process equipment such as stabilizers or heavy weight drill collars. The BHA is conveyed into the wellbore by a string of metallic tubulars (drill pipe). MWD equipment is used while drilling to provide downhole sensor and status information to surface in a near real-time mode. This information is used by the rig crew to make decisions about controlling and steering the well to optimize the drilling speed and trajectory based on numerous factors, including lease boundaries, existing wells, formation properties, hydrocarbon size and location, etc. This can include making intentional deviations from the planned wellbore path as necessary based on the information gathered from the downhole sensors during the drilling process. The ability to obtain real time MWD data allows for a relatively more economical and more efficient drilling operation.

The currently used MWD tools contain a sensor package to survey the well bore and send data back to surface by various telemetry methods. Such telemetry methods include but are not limited to the use of hardwired drill pipe, acoustic telemetry, fibre optic cable, Mud Pulse (MP) telemetry and Electromagnetic (EM) telemetry.

MP telemetry involves using a fluid pressure pulse generator to create pressure waves in the drill mud circulating in the drill string. Mud is circulated between the surface and downhole using positive displacement pumps. The resulting flow rate of mud is typically constant. The pulse generator creates pressure pulses by changing the flow area and/or path of the drilling fluid as it passes through the MWD tool in a timed, coded sequence, thereby creating pressure differentials in the drilling fluid. The pressure differentials or pulses may be either negative pulses or positive pulses in nature. Valves that use a controlled restriction within the circulating mud stream create a positive pressure pulse. Some valves are hydraulically powered to reduce the required actuation power typically resulting in a main valve indirectly operated by a pilot valve. The pilot valve closes a flow restriction which actuates the main valve to create a pressure drop.

The pressure pulses generated by the pulse generator are used to transmit information acquired by the downhole sensors. Signals from the sensor modules are received and processed in a data encoder in the BHA where the data is digitally encoded. A controller then actuates the pulse generator to generate the mud pulses which contain the encoded data. For example, the directional or inclination data is conveyed or modulated through the physical mud pulse at a particular amplitude and frequency. Typically a high-frequency sinusoid waveform is used as the carrier signal, but a square wave pulse train may also be used.

A number of encoding schemes can be used to encode data into mud pulses. These schemes include amplitude phase shift keying (ASK), frequency shift keying (FSK), phase shift keying (PSK), or a combination of these techniques. FSK is a frequency modulation scheme in which digital information is transmitted through discrete frequency changes of a carrier wave. The simplest FSK is binary FSK (BFSK). BFSK uses a pair of discrete frequencies to transmit binary (0s and 1s) information. ASK conveys data by changing the amplitude of the carrier wave; PSK conveys data by changing, or modulating, the phase of a reference signal (the carrier wave). ASK and PSK are each based on the modulating of a slightly different parameter of the signal frequency. It is known to combine different modulation techniques. For example, combining ASK and PSK is a digital modulation scheme that conveys data by changing, or modulating, both the amplitude and the phase of a reference signal (or the carrier wave).

The choice of modulation scheme uses a finite number of distinct signals to represent digital data, known as symbol sets. PSK uses a finite number of phases, each assigned a unique pattern of binary digits. Usually, each phase encodes an equal number of bits. Each pattern of bits forms the symbol that is represented by the particular phase. A demodulator at surface, designed specifically for the symbol-set used by the modulator, determines the phase of the received signal and maps it back to the symbol it represents, thus recovering the original data. An example of an 8 state PSK modulation scheme is shown in FIG. 1 (PRIOR ART), wherein a phase diagram and a waveform graph show how an eight (8) state symbol set can be modulated by generating a pressure pulse at a particular phase in that time period. The phase diagram shows how each three (3) bit symbol 000-111 is assigned one of the available 45° phases and the waveform graph shows a pressure pulse representing one of the 3 bits at each of the 8 phases in the time period. A telemetry signal can then be transmitted wherein a pressure pulse is generated per time period having a selected phase representing a particular 3 bit symbol.

To increase the data rate, the time period to transmit each pressure pulse can be reduced; however, reducing the time period also reduces the separation between phases, and increases the difficulty in decoding the telemetry signal at surface, especially when there has been significant attenuation of the signal as it traveled through the earth.

SUMMARY

According to one aspect of the invention, there is provided a method for modulating a downhole telemetry signal using a fluid pressure pulse generator that generates pressure pulses of multiple pulse heights in a drilling fluid. The method comprises: converting measurement data into a bitstream comprising symbols of a selected symbol set; encoding the bitstream into a pressure pulse telemetry signal using a modulation technique that includes amplitude shift keying, wherein each symbol of the selected symbol set is assigned a pressure pulse having a unique amplitude; and generating pressure pulses in the drilling fluid corresponding to the telemetry signal. Alternatively, the method can comprise a modulation technique that includes amplitude shift keying and phase shift keying and wherein each symbol of the selected symbol set is assigned a pressure pulse having a unique combination of amplitude and phase.

The fluid pressure pulse generator can generate two different pulse heights consisting of a low amplitude pressure pulse and a high amplitude pressure pulse having an amplitude that is greater than the low amplitude pressure pulse. Using such a pulse generator, the modulation technique can be an eight (8) state asymmetric phase shift keying (8APSK) and each pressure pulse has a unique combination of one of two different amplitudes and one of eight different phases. Alternatively, the modulation technique can be a 16 state asymmetric phase shift keying (16APSK) and each pressure pulse has a unique combination of one of two different amplitudes and one of 8 different phases.

The method can further comprise detecting the pressure pulses at surface and decoding the pressure pulses into a digital bitstream by: correlating each detected pressure pulse with a reference pressure pulse corresponding to a pressure pulse used to encode the measurement data into the telemetry signal, then associating the detected pressure pulse with a symbol that corresponds to the correlated reference pressure pulse. The detected pressure pulses can be digitized and a digital signal processing operation can be applied to the detected pressure pulses prior to decoding.

The method can also further comprise: measuring pressures of the low and high amplitude pressure pulses and determining the amplitudes of the low and high amplitude pressure pulses, and generating pressure pulses in the drilling fluid only when the determined amplitudes are between a low amplitude reference pressure and a high amplitude reference pressure. The pulse generator can be operated in a low amplitude pulse mode when the determined amplitude of the high amplitude pressure pulse exceeds the high amplitude reference pressure. The low amplitude pulse mode comprises generating only low amplitude pressure pulses and encoding the bitstream into a pressure pulse telemetry signal using phase shift keying wherein each symbol of the selected symbol set is assigned a pressure pulse having a unique phase. Alternatively, the pulse generator can be operated in a high amplitude pulse mode when the determined amplitude of the low amplitude pressure pulse is below the low amplitude reference pressure. The high amplitude pulse mode comprises generating only high amplitude pressure pulses and encoding the bitstream into a pressure pulse telemetry signal using phase shift keying wherein each symbol of the selected symbol set is assigned a pressure pulse having a unique phase.

According to another aspect of the invention, there is provided a downhole fluid pressure pulse telemetry apparatus comprising: a fluid pressure pulse generator operable to generate pressure pulses having multiple pulse heights; a motor subassembly; and an electronics subassembly. The motor subassembly comprises a pulse generator motor, a pulse generator motor housing that houses the motor, and a driveshaft extending from the motor out of the housing and coupling with the pulse generator. The electronics subassembly comprises: a controller communicative with a downhole sensor to read measurement data and with the motor to control operation of the pulse generator; and a memory having program code stored thereon and executable by the controller to perform a method comprising: converting the measurement data into a bitstream comprising symbols of a selected symbol set; encoding the bitstream into a pressure pulse telemetry signal using a modulation technique that includes amplitude shift keying wherein each symbol of the selected symbol set is assigned a pressure pulse having a unique amplitude; and operating the motor to cause the pulse generator to generate pressure pulses in the drilling fluid corresponding to the telemetry signal. Alternatively, the method can comprise a modulation technique that includes amplitude shift keying and phase shift keying and wherein each symbol of the selected symbol set is assigned a pressure pulse having a unique combination of amplitude and phase.

The apparatus can further comprise a pressure transducer positioned to measure a pressure of the drilling fluid flowing by the pulse generator. The controller can be communicative with the pressure transducer to read pressure measurements therefrom and the memory can further comprise program code executable by the controller to measure pressures of the low and high amplitude pressure pulses and determine the amplitudes of the low and high amplitude pressure pulses, and operate the motor to cause the pulse generator to generate pressure pulses in the drilling fluid only when the determined amplitudes are between a low amplitude reference pressure and a high amplitude reference pressure.

The memory can further comprise program code executable by the controller to operate the pulse generator in the aforementioned low amplitude pulse mode and high amplitude pulse mode.

According to yet another aspect of the invention, there is provided a surface receiver and signal processing apparatus comprising: a pressure transducer communicative with a drill site for detecting pressure pulses generated by the aforementioned downhole fluid pressure pulse telemetry apparatus; and a surface processor communicative with the pressure transducer and comprising a memory having program code executable by the surface processor to perform a method comprising: decoding the pressure pulses into a digital bitstream by correlating each detected pressure pulse with a reference pressure pulse corresponding to a pressure pulse used to encode the measurement data into the telemetry signal, then associating the detected pressure with the symbol that corresponds to the correlated reference pressure pulse. The surface receiver and signal processing apparatus can further comprise an analog to digital converter (ADC) communicative with the pressure transducer and operable to digitize the detected pressure pulses, and a digital signal processor (DSP) communicative with the ADC and operable to apply a digital signal processing operation of the detected pressure pulses. The processor can be communicative with the DSP to receive the digital bitstream.

BRIEF DESCRIPTION OF DRAWINGS

FIG. 13 is a phase diagram and waveform graph illustrating the mud pulse signal produced by a 16 APSK modulation method according to another embodiment of the invention.

DETAILED DESCRIPTION

Apparatus Overview

The embodiments described herein generally relate to a MWD tool having a fluid pressure pulse generator that generates pressure pulses of different peak amplitudes (otherwise known as "pulse heights"), and methods and apparatuses for encoding downhole measurement data into a modulated pressure pulse telemetry signal having multiple pulse heights. The fluid pressure pulse generator of the embodiments described herein may be used for mud pulse (MP) telemetry used in downhole drilling wherein the pressure pulses are transmitted via the drilling mud. The fluid pressure pulse generator may alternatively be used in other methods where it is necessary to generate a fluid pressure pulse.

Figure 2:
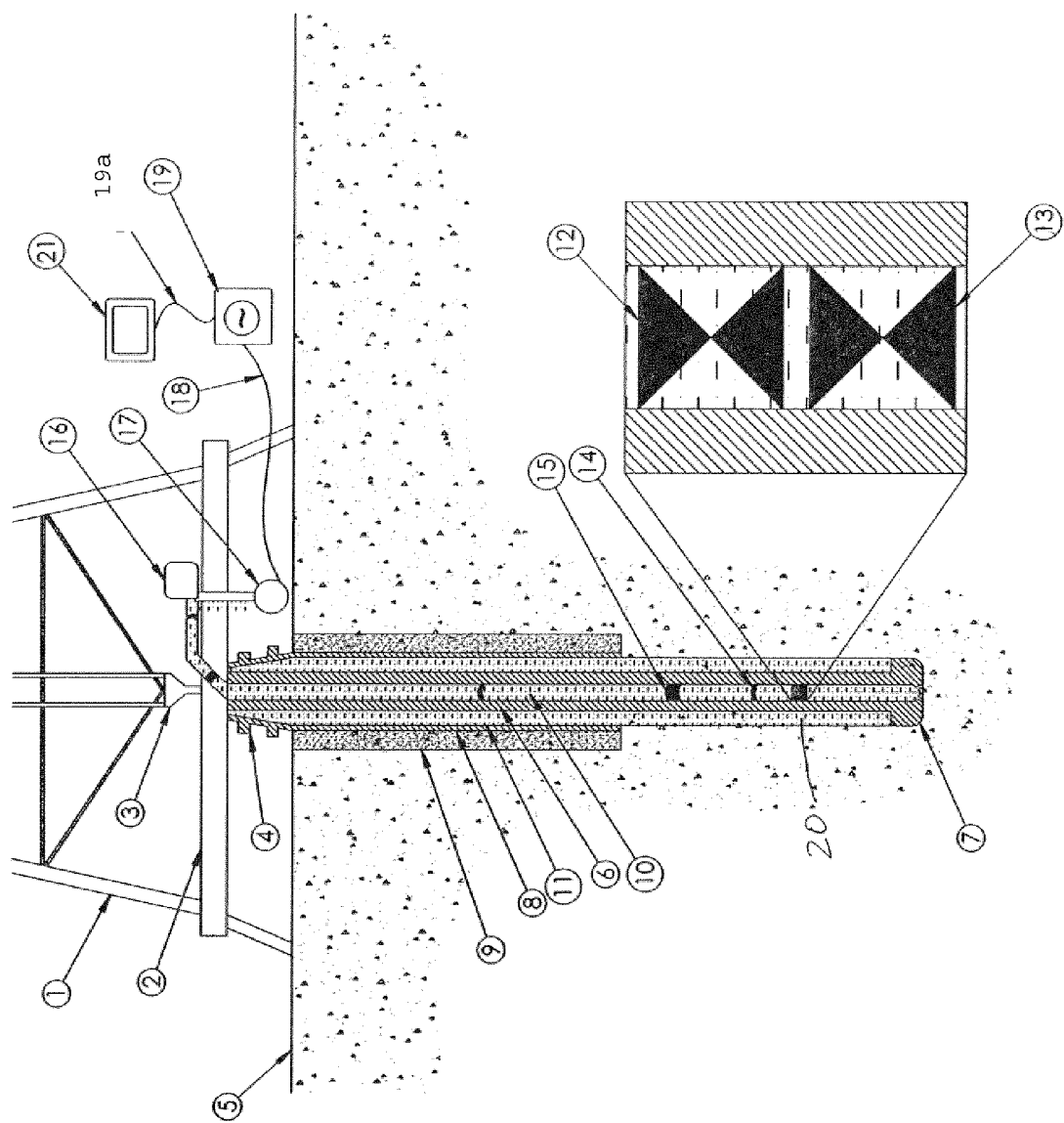
FIG. 2 is a schematic of a drill string in an oil and gas borehole comprising a MWD telemetry tool in accordance with embodiments of the invention.

Referring to FIG. 2, there is shown a schematic representation of a MP telemetry system in which embodiments of the present invention can be employed. Downhole drilling equipment including a derrick 1 with a rig floor 2 and draw works 3 to facilitate rotation of drill pipe 6 into the ground 5. The drill pipe 6 is enclosed in casing 8 which is fixed in position by casing cement 9. Bore drilling fluid 10 is pumped down drill pipe 6 to drill bit 7. Annular drilling fluid or "mud" 11 is then pumped back to the surface and passes through a blow out preventer (BOP) 4 positioned above the ground surface.

The drilling fluid is pumped down a drill string by a mud pump 16 and passes through a measurement while drilling (MWD) tool 20. The MWD tool 20 includes a fluid pressure pulse generator 30 according to one embodiment. The fluid pressure pulse generator 30 has a reduced flow configuration, schematically represented as valve 12, which generates a full positive pressure pulse (otherwise referred to as a "high amplitude pressure pulse" and represented schematically as 15) and an intermediate flow configuration, schematically represented as valve 13, which generates an intermediate positive pressure pulse (otherwise referred to as a "low amplitude pressure pulse" and represented schematically as 14). The low amplitude pressure pulse 14 has a lower peak amplitude pressure compared to the high amplitude pressure pulse 15. Measurement data acquired by downhole sensors (not shown) is transmitted in specific time divisions by the pressure pulses 14, 15 in bore drilling fluid 10. As will be discussed in detail below, measurement data from sensor modules in the MWD tool 20 or in another probe (not shown) are received and processed in a data encoder 105 (see FIG. 9) in the MWD tool 20 where the measurement data is digitally encoded into a mud pulse telemetry signal using a modulation scheme. This telemetry signal is sent to a controller 106 (see FIG. 9) in the MWD tool 20 which then actuates the fluid pressure pulse generator 30 to generate a dual pulse height telemetry signal having high and low amplitude pressure pulses 14, 15. The dual pulse height telemetry signal is transmitted to the surface and detected by a surface pressure transducer 17. The measured pressure pulses are transmitted as electrical signals through transducer cable 18 to surface receiving and processing equipment 19 which decodes and displays the transmitted information to the drilling operator in a rig display 21 via receiver box communication cable 19a.

The characteristics of the low and high amplitude pressure pulses 14, 15 are defined by amplitude, duration, shape, and frequency, which characteristics are used in various encoding systems to represent binary data. In the present embodiments and as will be described in detail below, the telemetry signal is encoded by a modulation scheme that utilises the different pulse heights of the pressure pulses 14, 15 to allow for greater variation in the binary data being produced and therefore quicker and/or more accurate transmission of downhole measurement data compared to mud pulse telemetry techniques that use pressure pulses of only one pulse height.

At surface, one or more signal processing techniques are used to separate undesired mud pump noise, rig noise or downward propagating noise from the received telemetry signals. The data transmission rate is governed by Lamb's theory for acoustic waves in a drilling mud and is about 1.1 to 1.5 km/s. The fluid pressure pulse generator 30 tends to operate in an unfriendly environment under high static downhole pressures, high temperatures, high flow rates and various erosive flow types. The fluid pressure pulse generator 30 generates pulses between 100-300 psi and typically operates in a flow rate as dictated by the size of the drill pipe bore, and limited by surface pumps, drill bit total flow area (TFA), and mud motor/turbine differential requirements for drill bit rotation.

Figure 3:
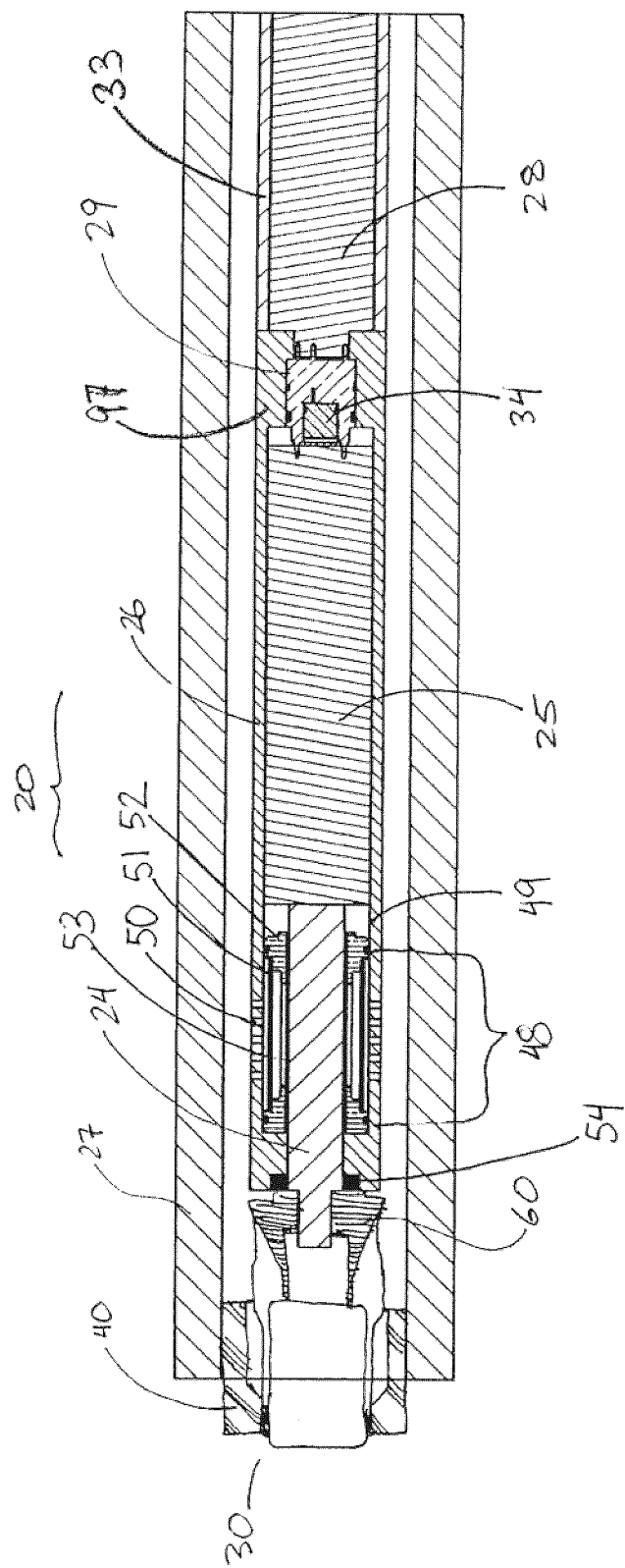
FIG. 3 is a longitudinally sectioned view of a mud pulser section of the MWD tool comprising a fluid pressure pulse generator, an electronics subassembly, and a pulse generator motor subassembly.
Figure 4:
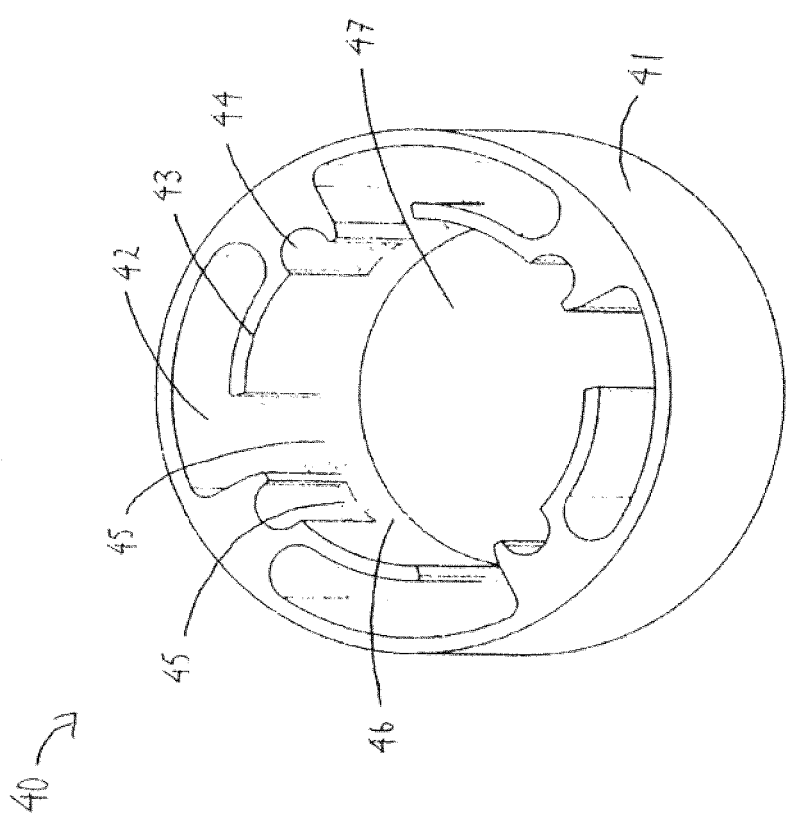
FIG. 4 is a perspective view of a stator of a fluid pressure pulse generator of the MWD tool.
Figure 5:
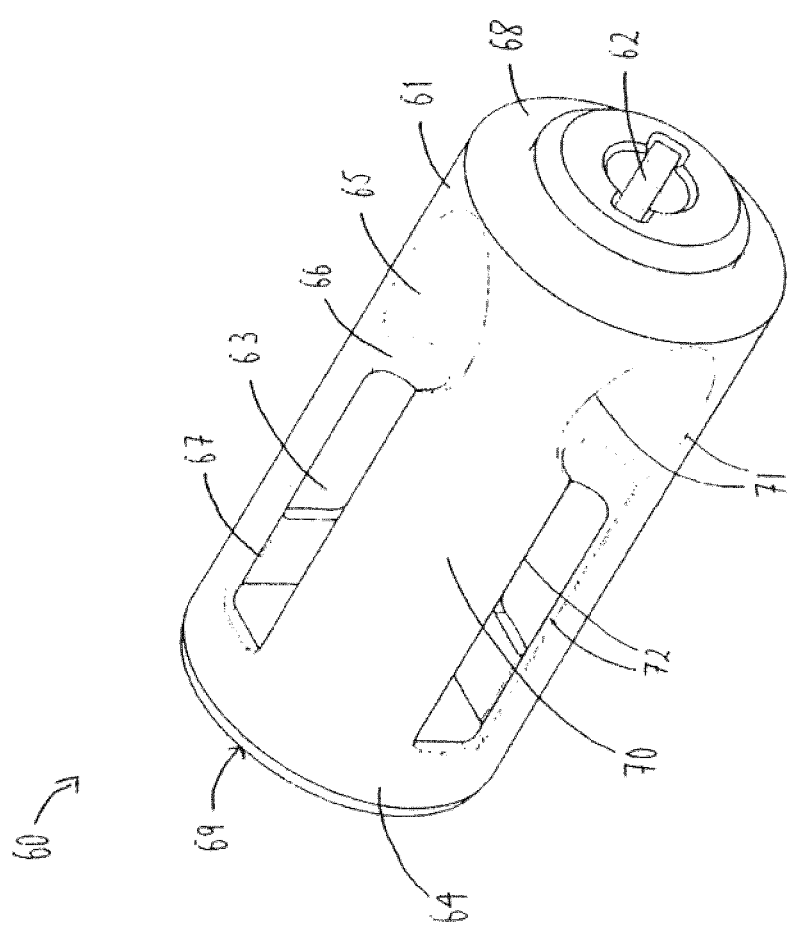
FIG. 5 is a perspective view of a rotor of the fluid pressure pulse generator.

Referring to FIG. 3, the MWD tool 20 is shown in more detail. The MWD tool 20 generally comprises the fluid pressure pulse generator 30 which creates the fluid pressure pulses 14, 15, and a pulser assembly 26 which takes measurements while drilling and which drives the fluid pressure pulse generator 30; the pulse generator 30 and pulser assembly 26 are axially located inside a drill collar (not shown)

with an annular gap therebetween to allow mud to flow through the gap. The fluid pressure pulse generator 30 generally comprises a stator 40 and a rotor 60. The stator 40 is fixed to a landing sub 27 and the rotor 60 is fixed to a drive shaft 24 of the pulser assembly 26. The pulser assembly 26 is fixed to the drill collar. The pulser assembly 26 includes a pulse generator motor subassembly 25 and an electronics subassembly 28 electronically coupled together but fluidly separated by a feed-through connector 29. The motor subassembly 25 includes a pulse generator motor housing 49 which houses components including a pulse generator motor (not shown), gearbox (not shown), and a pressure compensation device 48. The electronics subassembly 28 includes an electronics housing 33 which is coupled to an end of the pulse generator motor housing 49 and which houses downhole sensors, control electronics, and other components (not shown) required by the MWD tool 20 to determine the direction and inclination information and to take measurements of drilling conditions, to encode this telemetry data using one or more known modulation techniques into a telemetry signal, and to send motor control signals to the pulse generator motor to rotate the drive shaft 24 and rotor 60 in a controlled pattern to generate pressure pulses 14, 15 representing the telemetry signal for transmission to surface.

The motor subassembly 25 is filled with a lubricating liquid such as hydraulic oil or silicon oil; this lubricating liquid is fluidly separated from the mud flowing through the pulse generator 30; however, the pressure compensation device 48 comprises a flexible membrane 51 in fluid communication with both the mud and the lubrication liquid, which allows the pressure compensation device 48 to maintain the pressure of the lubrication liquid at about the same pressure as the drilling mud at the pulse generator 30. A pressure transducer 34 is seated inside the feed through connector 29 (collectively "pressure transducer and feed through subassembly 29, 34") and faces the inside of the pulse generator motor housing. The pressure transducer 34 can thus measure the pressure of the lubrication liquid, and hence the pressure of the drilling mud; this enables the pressure transducer 34 to take pressure measurements of pressure pulses 14, 15 generated by the pulse generator 30 while being protected from the harsh environment of drilling mud.

The fluid pressure pulse generator 30 and electronics subassembly 28 will now each be described in more detail:

Fluid Pressure Pulse Generator

The fluid pressure pulse generator 30 is located at the downhole end of the MWD tool 20. Drilling fluid pumped from the surface by the pump 16 flows between the outer surface of the pulser assembly 26 and the inner surface of the landing sub 27. When the fluid reaches the fluid pressure pulse generator 30 it is diverted through fluid openings 67 in the rotor 60 and exits the internal area of the rotor 60 as will be described in more detail below with reference to FIGS. 4 to 8. In different configurations of the rotor 60/stator 40 combination, the fluid flow area varies, thereby creating positive low and high amplitude pressure pulses 14, 15 that are transmitted to the surface.

Figure 6:
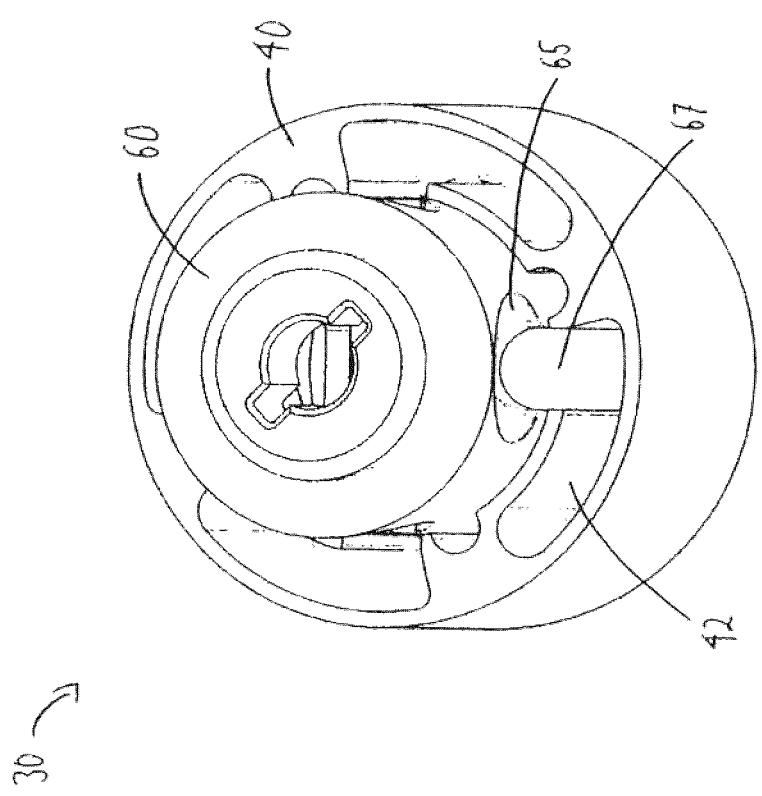
FIG. 6 is a perspective view of the rotor/stator combination of the fluid pressure pulse generator in full flow configuration.
Figure 7:
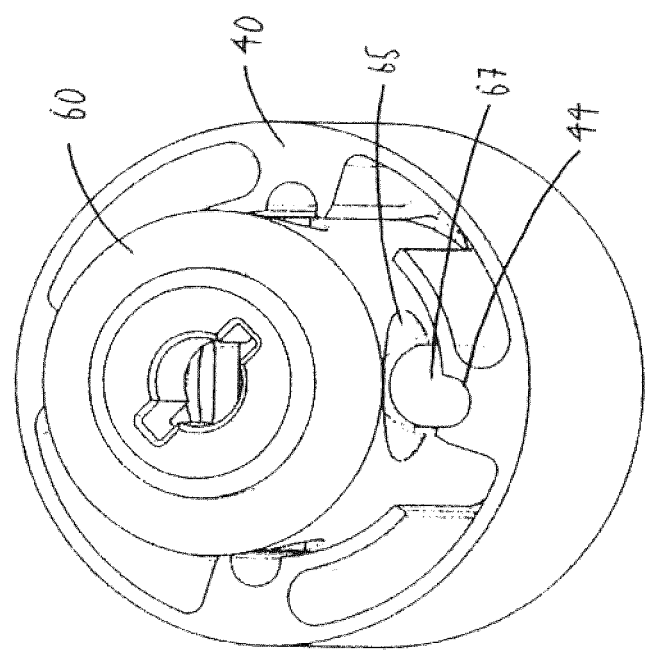
FIG. 7 is a perspective view of the rotor/stator combination of FIG. 6 in intermediate flow configuration.
Figure 8:
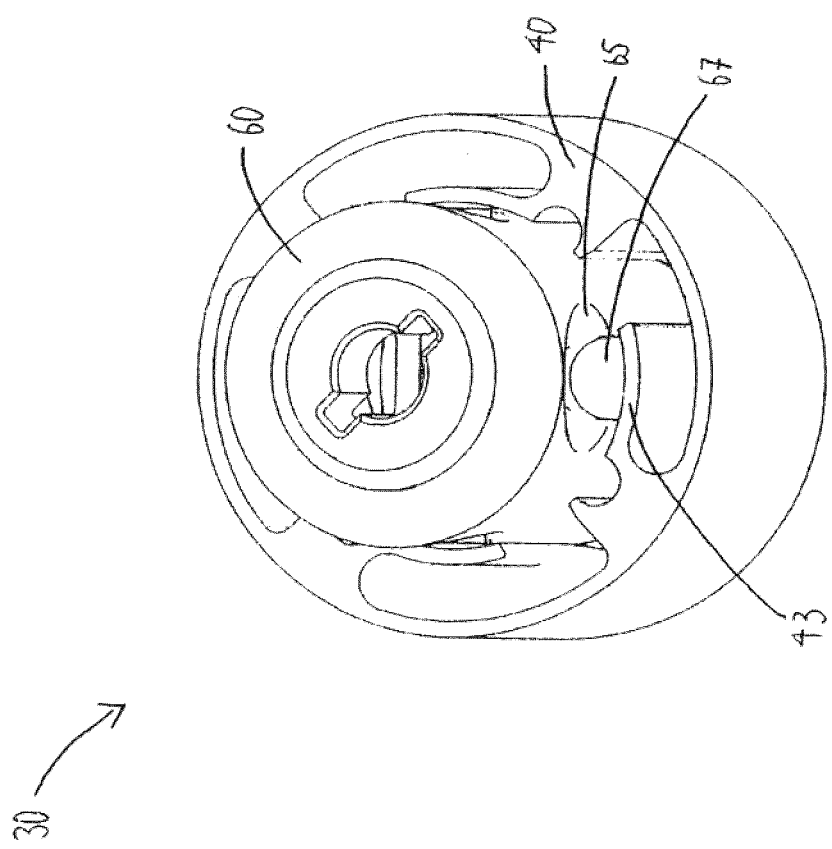
FIG. 8 is a perspective view of the rotor/stator combination of FIG. 6 in reduced flow configuration.

Referring now to FIGS. 4 to 8, there is shown the stator 40 and rotor 60 which combine to form the fluid pressure pulse generator 30. The rotor 60 comprises a cylindrical body 61 having an uphole end 68 with a drive shaft receptacle 62 and a downhole opening 69. The drive shaft receptacle 62 is configured to receive and fixedly connect with the drive shaft 24 of the pulser assembly 26, such that in use the rotor 60 is rotated by the drive shaft 24. The stator 40 comprises a stator body 41 with a circular opening 47 therethrough sized to receive the cylindrical body 61 of the rotor as shown in FIGS. 6 to 8. The stator body 41 may be annular or ring shaped as shown in the embodiment of FIGS. 4 to 8, to enable it to fit within a drill collar of a downhole drill string, however in alternative embodiments (not shown) the stator body may be a different shape, for example square shaped, rectangular shaped, or oval shaped depending on the fluid pressure pulse operation it is being used for.

The stator 40 and rotor 60 are made up of minimal parts and their configuration beneficially provides easy line up and fitting of the rotor 60 within the stator 40. There is no positioning or height requirement and no need for an axial gap between the stator 40 and the rotor 60 as is required with known rotating disc valve pulsers. It is therefore not necessary for a skilled technician to be involved with set up of the fluid pressure pulse generator 30 and the operator can easily change or service the stator 40/rotor 60 combination if flow rate conditions change or there is damage to the rotor 60 or stator 40 during operation.

The cylindrical body 61 of the rotor has four rectangular fluid openings 67 separated by four leg sections 70 and a mud lubricated journal bearing ring section 64 defining the downhole opening 69. The bearing ring section 64 helps centralize the rotor 60 in the stator 40 and provides structural strength to the leg sections 70. The cylindrical body 61 also includes four depressions 65 that are shaped like the head of a spoon on an external surface of the cylindrical body 61. Each spoon shaped depression 65 is connected to one of the fluid openings 67 by a flow channel 66 on the external surface of the cylindrical body 61. Each connected spoon shaped depression 65, flow channel 66 and fluid opening 67 forms a fluid diverter and there are four fluid diverters positioned equidistant circumferentially around the cylindrical body 61.

The spoon shaped depressions 65 and flow channels 66 direct fluid flowing in a downhole direction external to the cylindrical body 61, through the fluid openings 67, into a hollow internal area 63 of the body, and out of the downhole opening 69. Each spoon shaped depression 65 gently slopes, with the depth of the depression increasing from the uphole end to the downhole end of the depression ensuring that the axial flow path or radial diversion of the fluid is gradual with no sharp turns.

The spoon shaped depressions 65 act as nozzles to aid fluid flow. Without being bound by science, it is thought that the nozzle design results in increased volume of fluid flowing through the fluid opening 67 compared to an equivalent fluid diverter without the nozzle design. Curved edges 71 of the spoon shaped depressions 65 also provide less resistance to fluid flow and reduction of pressure losses across the rotor/stator as a result of optimal fluid geometry. Furthermore, the curved edges 71 of the spoon shaped depressions 65 have a reduced surface compared to, for example, a channel having the same flow area as the spoon shaped depression 65. This means that the surface area of the curved edges 71 cutting through fluid when the rotor is rotated is minimized, thereby minimizing the force required to turn the rotor and reducing the pulse generator motor torque requirement. By reducing the pulse generator motor torque requirement, there is beneficially a reduction in battery consumption and less wear on the motor, beneficially minimizing costs.

Motor torque requirement is also reduced by minimizing the surface area of edges 72 of each leg section 70 which are perpendicular to the direction of rotation. Edges 72 cut through the fluid during rotation of the rotor 60 and therefore beneficially have as small a surface area as possible whilst still maintaining structural stability of the leg sections 70. To increase structural stability of the leg sections 70, the thickness at the middle of the leg section 70 furthest from the edges 72 may be greater than the thickness at the edges 72, although the wall thickness of each leg section 70 may be the same throughout. In addition, the bearing ring section 64 of the cylindrical body 61 provides structural stability to the leg sections 70.

In alternative embodiments (not shown) a different curved shaped depression other than the spoon shaped depression may be utilized on the external surface of the rotor, for example, but not limited to, egg shaped, oval shaped, arc shaped, or circular shaped. Furthermore, the flow channel 66 need not be present and the fluid openings 67 may be any shape that allows flow of fluid from the external surface of the rotor through the fluid openings 67 to the hollow internal area 63.

The stator body 41 includes four full flow chambers 42, four intermediate flow chambers 44 and four walled sections 43 in alternating arrangement around the stator body 41. In the embodiment shown in FIGS. 4 to 8, the four full flow chambers 42 are L shaped and the four intermediate flow chambers 44 are U shaped, however in alternative embodiments (not shown) other configurations may be used for the chambers 42, 44. The geometry of the chambers is not critical provided the flow area of the chambers is conducive to generating the low amplitude pressure pulse 14 and no pulse in different flow configurations as described below in more detail. A solid bearing ring section 46 at the downhole end of the stator body 41 helps centralize the rotor in the stator and minimizes flow of fluid between the external surface of the rotor 60 and the internal surface of the stator 40. Four flow sections are positioned equidistant around the circumference of the stator 40, with each flow section having one of the intermediate flow chambers 44, one of the full flow chambers 42, and one of the wall sections 43. The full flow chamber 42 of each flow section is positioned between the intermediate flow chamber 44 and the walled section 43.

In use, each of the four flow sections of the stator 40 interacts with one of the four fluid diverters of the rotor 60. The rotor 60 is rotated in the fixed stator 40 to provide three different flow configurations as follows:

1. Full flow—where the rotor fluid openings 67 align with the stator full flow chambers 42, as shown in FIG. 6;
2. Intermediate flow—where the rotor fluid openings 67 align with the stator intermediate flow chambers 44, as shown in FIG. 7; and
3. Reduced flow—where the rotor fluid openings 67 align with the stator walled sections 43, as shown in FIG. 8.

In the full flow configuration shown in FIG. 6, the stator full flow chambers 42 align with the fluid openings 67 and flow channels 66 of the rotor, so that fluid flows from the full flow chambers 42 through the fluid openings 67. The flow area of the full flow chambers 42 may correspond to the flow area of the rotor fluid openings 67. This corresponding sizing beneficially leads to no or minimal resistance in flow of fluid through the fluid openings 67 when the rotor is positioned in the full flow configuration. There is zero pressure increase and no pressure pulse is generated in the full flow configuration. The L shaped configuration of the chambers 42 minimizes space requirement as each L shaped chamber tucks behind one of the walled sections 43 allowing for a compact stator design, which beneficially reduces production costs and results in less likelihood of blockage.

When the rotor 60 is positioned in the reduced flow configuration as shown in FIG. 8, there is no flow area in the stator as the walled section 43 aligns with the fluid openings 67 and flow channels 66 of the rotor. Fluid is still diverted by the spoon shaped depressions 65 along the flow channels 66 and through the fluid openings 67, however, the total overall flow area is reduced compared to the total overall flow area in the full flow configuration. The fluid pressure therefore increases to generate the high amplitude pressure pulse 15.

In the intermediate flow configuration as shown in FIG. 7, the intermediate flow chambers 44 align with the fluid openings 67 and flow channels 66 of the rotor, so that fluid flows from the intermediate flow chambers 44 through the fluid openings 67. The flow area of the intermediate flow chambers 44 is less than the flow area of the full flow chambers 42, therefore, the total overall flow area in the intermediate flow configuration is less than the total overall flow area in the full flow configuration, but more than the total overall flow area in the reduced flow configuration. As a result, the flow of fluid through the fluid openings 67 in the intermediate flow configuration is less than the flow of fluid through the fluid openings 67 in the full flow configuration, but more than the flow of fluid through the fluid openings 67 in the reduced flow configuration. The low amplitude pressure pulse 14 is therefore generated with a peak amplitude pressure that is lower compared to the high amplitude pressure pulse 15. The flow area of the intermediate flow chambers 44 may be one half, one third, one quarter the flow area of the full flow chambers 42, or any amount that is less than the flow area of the full flow chambers 42 to generate the low amplitude pressure pulse 14 and allow for differentiation between the low amplitude pressure pulse 14 and the high amplitude pressure pulse 15.

When the rotor 60 is positioned in the reduced flow configuration as shown in FIG. 8, fluid is still diverted by the spoon shaped depressions 65 along the flow channels 66 and through the fluid openings 67 otherwise the pressure build up would be detrimental to operation of the downhole drilling. In the present embodiment, the constant flow of fluid is through the rotor fluid openings 67. This beneficially reduces the likelihood of blockages and also allows for a more compact stator design as there is no need to have additional fluid openings in the stator.

A bottom face surface 45 of both the full flow chambers 42 and the intermediate flow chambers 44 of the stator 40 may be angled in the downhole flow direction for smooth flow of fluid from chambers 42, 44 through the rotor fluid openings 67 in the full flow and intermediate flow configurations respectively, thereby reducing flow turbulence. In all three flow configurations the full flow chambers 42 and the intermediate flow chambers 44 are filled with fluid, however fluid flow from the chambers 42, 44 will be restricted unless the rotor fluid openings 67 are aligned with the full flow chambers 42 or intermediate flow chambers 44 in the full flow and intermediate flow configurations respectively.

A combination of the spoon shaped depressions 65 and flow channels 66 of the rotor 60 and the angled bottom face surface 45 of the chambers 42, 44 of the stator provide a smooth fluid flow path with no sharp angles or bends. The smooth fluid flow path beneficially minimizes abrasion and wear on the pulser assembly 26.

Provision of the intermediate flow configuration allows the operator to choose whether to use the reduced flow configuration, intermediate flow configuration or both configurations to generate pressure pulses depending on fluid flow conditions. The fluid pressure pulse generator 30 can operate in a number of different flow modes that suit a number of different flow conditions. For higher fluid flow rate conditions, for example, but not limited to, deep downhole drilling or when the drilling mud is heavy or viscous, the pressure generated using the reduced flow configuration may be too great and cause damage to the system. The operator may therefore choose to only operate in a low amplitude pulse mode wherein the pulse generator 30 only operates between the intermediate and full flow configurations to produce detectable pressure pulses at the surface (low amplitude pressure pulses). For lower fluid flow rate conditions, for example, but not limited to, shallow downhole drilling or when the drilling mud is less viscous, the pressure pulse generated in the intermediate flow configuration may be too low to be detectable at the surface. The operator may therefore choose to operate in a high amplitude pulse mode wherein the pulse generator only operates between the reduced and full flow configurations to produce detectable pressure pulses at the surface (high amplitude pressure pulses). Thus it is possible for the downhole drilling operation to continue when the fluid flow conditions change without having to change the fluid pressure pulse generator 30. For normal fluid flow conditions, the operator may choose to use all three configurations, i.e. the reduced flow configuration, the intermediate flow configuration, and the full flow configuration in a normal or "combined" mode to produce both low and high amplitude pressure pulses 14, 15. By generating two pulses of different peak amplitudes over a given time period, the data rate of the fluid pressure pulse generator 30 can be increased compared to a pulse generator which only generates single amplitude pulses over the same time period.

If one of the stator chambers (either full flow chambers 42 or intermediate flow chambers 44) is blocked or damaged, or one of the stator wall sections 43 is damaged, operations can continue, albeit at reduced efficiency, until a convenient time for maintenance. For example, if one or more of the stator wall sections 43 is damaged, the high amplitude pressure pulse 15 will be affected; however operation may continue using the intermediate flow configuration to generate the low amplitude pressure pulse 14. Alternatively, if one or more of the intermediate flow chambers 44 is damaged or blocked, the low amplitude pressure pulse 14 will be affected; however operation may continue using the reduced flow configuration to generate the high amplitude pressure pulse 15. If one or more of the full flow chambers 42 is damaged or blocked, operation may continue by rotating the rotor between the reduced flow configuration and the intermediate flow configuration. Although there will be no zero pressure state, there will still be a pressure differential between the high amplitude pressure pulse 15 and the low amplitude pressure pulse 14 which can be detected and decoded on the surface until the stator 40 can be serviced. Furthermore, if one or more of the rotor fluid openings 67 are damaged or blocked which results in one of the flow configurations not being usable, the other two flow configurations can be used to produce a detectable pressure differential. For example, damage to one of the rotor fluid openings 67 may result in an increase in fluid flow through the rotor such that the intermediate flow configuration and the full flow configuration do not produce a detectable pressure differential, and the reduced flow configuration will need to be used to get a detectable pressure pulse.

Provision of multiple rotor fluid openings 67 and multiple stator chambers 42, 44 and wall sections 43, provides redundancy and allows the fluid pressure pulse generator 30 to continue working when there is damage or blockage to one of the rotor fluid openings 67 and/or one of the stator chambers 42, 44 or wall sections 43. Cumulative flow of fluid through the remaining undamaged or unblocked rotor fluid openings 67 and stator chambers 42, 44 still results in generation of detectable high and low pressure pulses 14, 15, even though the pulse heights may not be the same as when there is no damage or blockage.

It is evident from the foregoing that while the embodiments shown in FIGS. 4 to 8 utilize four fluid openings 67 together with four full flow chambers 42, four intermediate flow chambers 44 and four wall sections 43 in the stator, different numbers of rotor fluid openings 67, stator flow chambers 42, 44 and stator wall sections 43 may be used. Provision of more fluid openings 67, chambers 42, 44 and wall section 43 beneficially reduces the amount of rotor rotation required to move between the different flow configurations, however, too many openings 67, chambers 42, 44 and wall section 43 may decrease the stability of the rotor and/or stator and may result in a less compact design thereby increasing production costs. Furthermore, the number of rotor fluid openings 67 need not match the number of stator flow chambers 42, 44 and stator wall sections 43. Different combinations may be utilized according to specific operation requirements of the fluid pressure pulse generator. In alternative embodiments (not shown) the intermediate flow chambers 44 need not be present or there may be additional intermediate flow chambers present that have a flow area less than the flow area of full flow chambers 42. The flow area of the additional intermediate flow chambers may vary to produce additional intermediate pressure pulses and increase the data rate of the fluid pressure pulse generator 30. In other words, a fluid pressure pulse generator can be provided that can generate three or even more different pulse heights.

Electronics Subassembly

Figure 9:
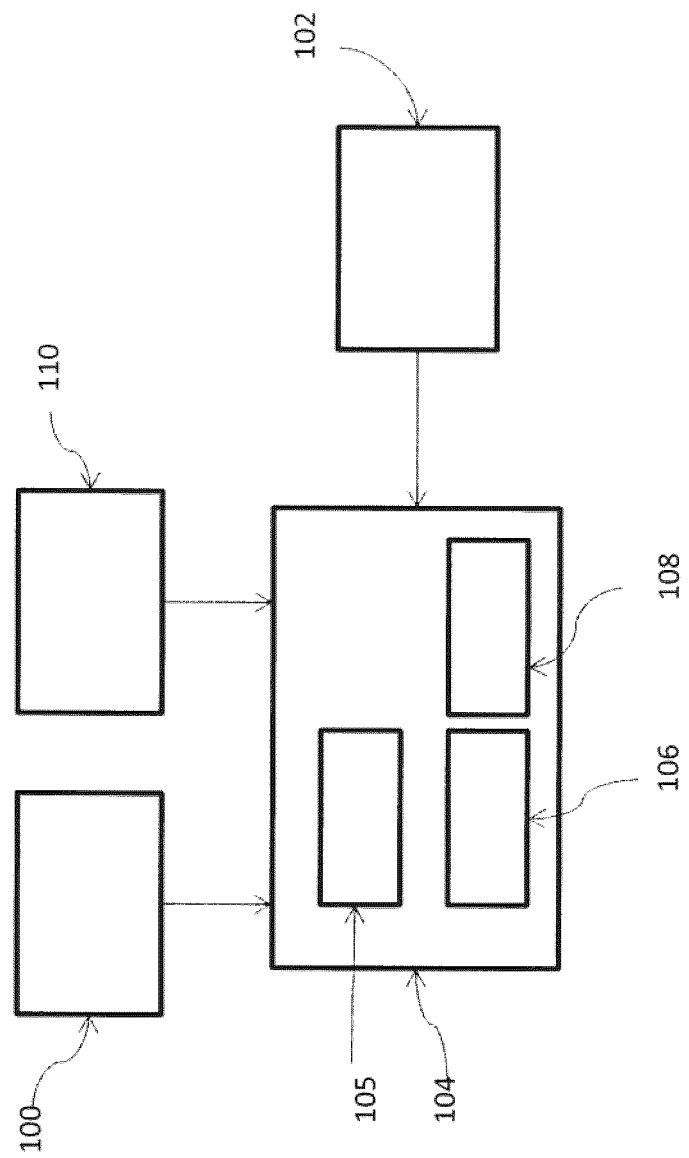
FIG. 9 is a schematic block diagram of components of the electronics subassembly for encoding telemetry data into mud pulse signals and transmitting the signals to surface.

Referring now to FIG. 9, the electronics subassembly 28 includes sensors for taking various downhole measurements, and encoding and processing equipment for encoding the measurements and other information (collectively "telemetry data") into a telemetry signal for transmission by the pulse generator 30 as mud pulses to surface. More particularly, the electronics subassembly 28 comprises a directional and inclination (D&I) sensor module 100, drilling conditions sensor module 102, a motor driver circuit board 104 containing a data encoder 105, a central processing unit (controller) 106 and a memory 108 having stored thereon program code executable by the controller 106, and a battery stack 110.

The D&I sensor module 100 comprises three axis accelerometers, three axis magnetometers and associated data acquisition and processing circuitry. Such D&I sensor modules are well known in the art and thus are not described in detail here.

The drilling conditions sensor module 102 include sensors mounted on a circuit board for taking various measurements of borehole parameters and conditions such as temperature, pressure, shock, vibration, rotation and directional parameters. Such sensor modules 102 are also well known in the art and thus are not described in detail here.

Alternatively, other sensors (not shown) located elsewhere on the tool 20 are communicative with the circuit board 104 and provide measurement data to the controller 106. One example of such a sensor is a pressure transducer which can be located in a probe near the drill collar to directly measure drilling fluid pressure. Another example is the pressure transducer 34 located in the feed through connector 29 which measures the pressure of the lubrication oil in the motor subassembly 25; as the pressure inside the motor assembly 25 is pressure compensated with the outside drilling fluid, the pressure transducer 34 also indirectly measures the drilling fluid pressure.

The main circuit board 104 can be a printed circuit board with electronic components soldered on the surface of the board. The main circuit board 104 and the sensor modules 100, 102 are secured on a carrier device (not shown) which is fixed inside the electronics housing 33 by end cap structures (not shown). The sensor modules 100, 102 are each electrically communicative with the main circuit board 104 and send measurement data to the encoder 105. The encoder 105 is programmed to encode this measurement data into a telemetry signal using one or a combination of modulation techniques.

The controller 106 is programmed to send motor control signals to the pulse generator 30 to operate in a manner that generates mud pulses that transmit the mud pulse telemetry signal as determined by the encoder 105. The memory 108 has stored thereon program code including a modulation program executable by the encoder 105 to perform the encoding operation, and a motor control program executable by the controller 106 to operate the pulse generator 30. The memory 108 can comprise separate memory units resident on each of the encoder 105 and controller 106 or can be a single memory unit accessible by both the encoder 105 and controller 106; the program code can be stored on read-only memory (ROM) or random access memory (RAM). In this embodiment, the encoder 105 is a separate processor from the controller 106 but alternatively a single processor can be used to perform both data encoding and motor control functions provided by the encoder 105 and controller 106.

Surface Receiving and Processing Equipment

Figure 10:
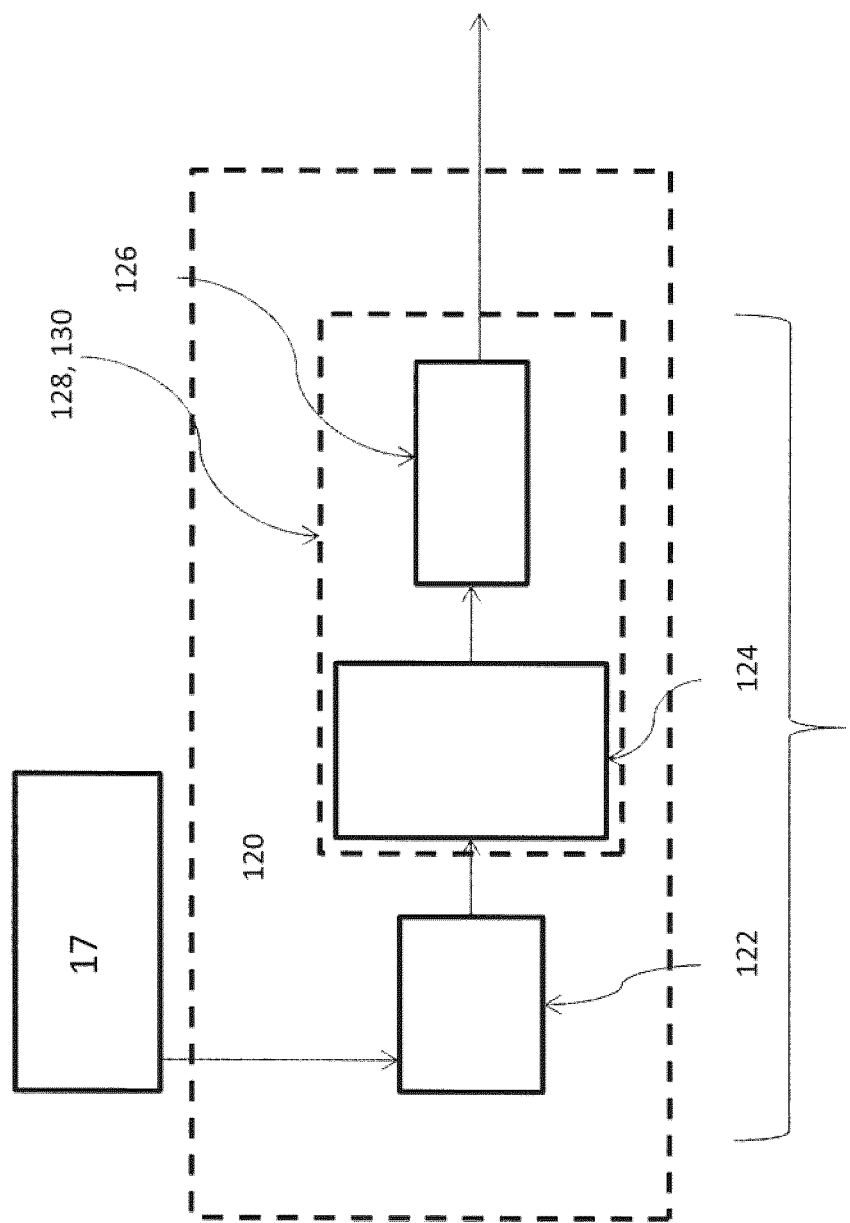
FIG. 10 is a schematic block diagram of components of surface receiving and processing equipment for receiving mud pulse signals and decoding the signals into telemetry data.

Referring now to FIG. 10, the pressure pulses 14, 15 transmitted by the pulse generator 30 are detected by the surface pressure transducer 17 and transmitted as analog electrical signals through the transducer cable 18 to the surface receiving and processing equipment 19. The surface receiving and processing equipment comprises a surface receiver circuit board 120, an analog-to-digital converter (ADC) 122 on the circuit board which converts the analog electrical signals into a digital data stream, a digital signal processor (DSP) 124 which applies various digital signal processing operations on the data stream, and a decoder 126 which decodes the data stream into the telemetry data. The DSP 124 and decoder 126 can be separate processors or as in this embodiment, by carried out by a central processing unit (CPU) 128 executing a digital signal processing program and decoder program stored on the memory 130. Alternatively, separate hardware components can be used to perform one or more of the DSP and decoding functions; for example, an application-specific integrated circuit (ASIC) or field-programmable gate arrays (FPGA) can be used to perform the digital signal processing in a manner as is known in the art.

In this embodiment, the memory 130 has stored thereon program code executable by the CPU 128 to carry out a digital signal processing operation as is known in the art and a decoding operation as will be discussed in more detail below. Digital signal processing operations can include, for example, executing a noise cancelling algorithm to isolate the telemetry signal.

Encoding Telemetry Data into Mud Pulse Telemetry Signal and Decoding at Surface

As previously noted, the memory 108 contains encoder program code that can be executed by the encoder 105 to encode telemetry data into a mud pulse telemetry signal having pressure pulses of numerous pulse heights. When used with the dual pulse height pressure pulse generator 30, this program code when executed will utilize the two different pulse heights of the low and high amplitude pressure pulses 14, 15 generated to either convey more data over a given time period compared to a conventional single pulse height pulse generator, and/or increase the separation between adjacent pulses thereby improving signal clarity and making it easier to decode the telemetry signal. Alternatively, the program code can be adapted for use with pulse generators with more than two different pulse heights, to provide an even greater capability to transmit data and/or improve signal clarity.

The encoder program code utilizes a modulation technique that uses principles of known digital modulation techniques. In this embodiment, the encoder program code utilizes a modulation technique known as asymmetric phase shift keying (APSK) that is a combination of amplitude shift keying and phase shift keying to encode the telemetry data into a dual pulse height telemetry signal. More particularly, the encoder program code can utilize a 3 bit, 8 state version of APSK known as 8APSK as shown in FIG. 12 or a 4 bit 16 state version of APSK known as 16APSK as shown in FIG. 13.

Alternatively, another modulation technique can be used that includes amplitude shift keying only, or amplitude shift keying along with another type of modulation such as frequency shift keying. The pulse generator 30 as described herein can, for example, be used with an ASK modulation technique having 3 states, namely a first state corresponding to no-pulse flow, a second state corresponding to a low pulse height, and a third state corresponding to a high pulse height. Pulse generator capable of additional pulse heights can be used with ASK modulation having a higher number of states. Also, other pulse generator designs may be used with a modulation technique that includes a combination of ASK and FSK, for example.

Figure 12:
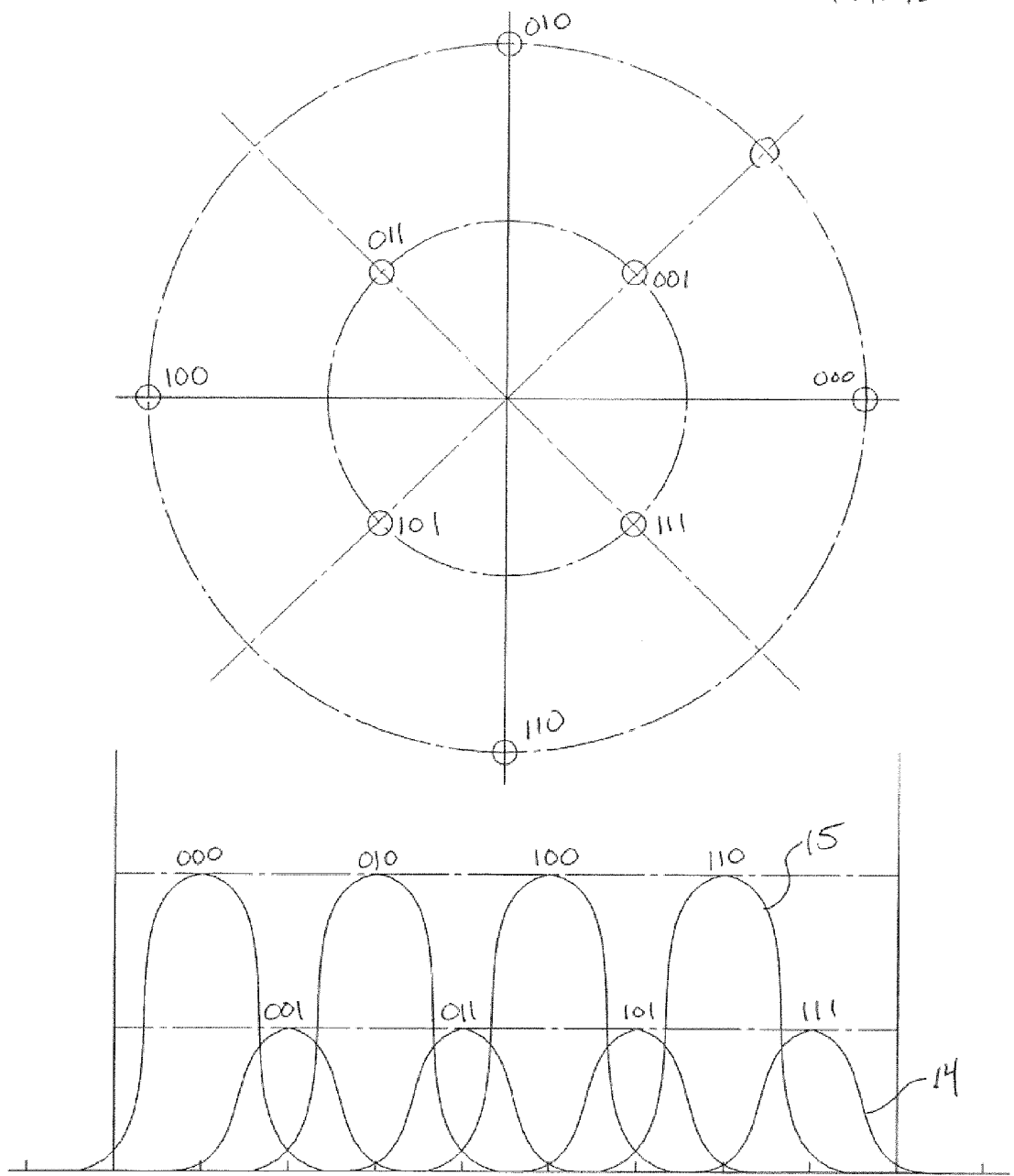
FIG. 12 is a phase diagram and waveform graph illustrating the mud pulse signal produced by the 8APSK modulation method shown in FIG. 11(a).

Referring to FIG. 12 and according to a first embodiment, the memory 108 contains encoder program code executable by the encoder 105 to encode measurement data into a 3 bit, 8 state telemetry signal using an 8APSK modulation technique. While the data rate is the same as a conventional 3 bit, 8 state PSK modulation technique utilizing single height pressure pulses, the use of two different height pressure pulses provides greater separation between pulses thereby improving signal clarity. As in the conventional PSK modulation technique shown in FIG. 1, the 8APSK modulation technique of this embodiment uses an 8 state symbol set wherein each symbol (bit) 000 to 111 corresponds to a pressure pulse having a unique one of eight distinct phases. Unlike the conventional PSK modulation technique, the encoder program code will utilize the 8APSK modulation technique to assign four states (symbols) to four high amplitude pressures pulses of different phases and four low amplitude pressure pulses of different phases. That is, symbol 000, 010, 100, and 110 are assigned high amplitude pressure pulses at phases of 0°, 90°, 180° and 270°; and symbols 001, 011, 101, and 111 are assigned low amplitude pressure pulses at phases of 45°, 135°, 225° and 315°.

Figure 1:
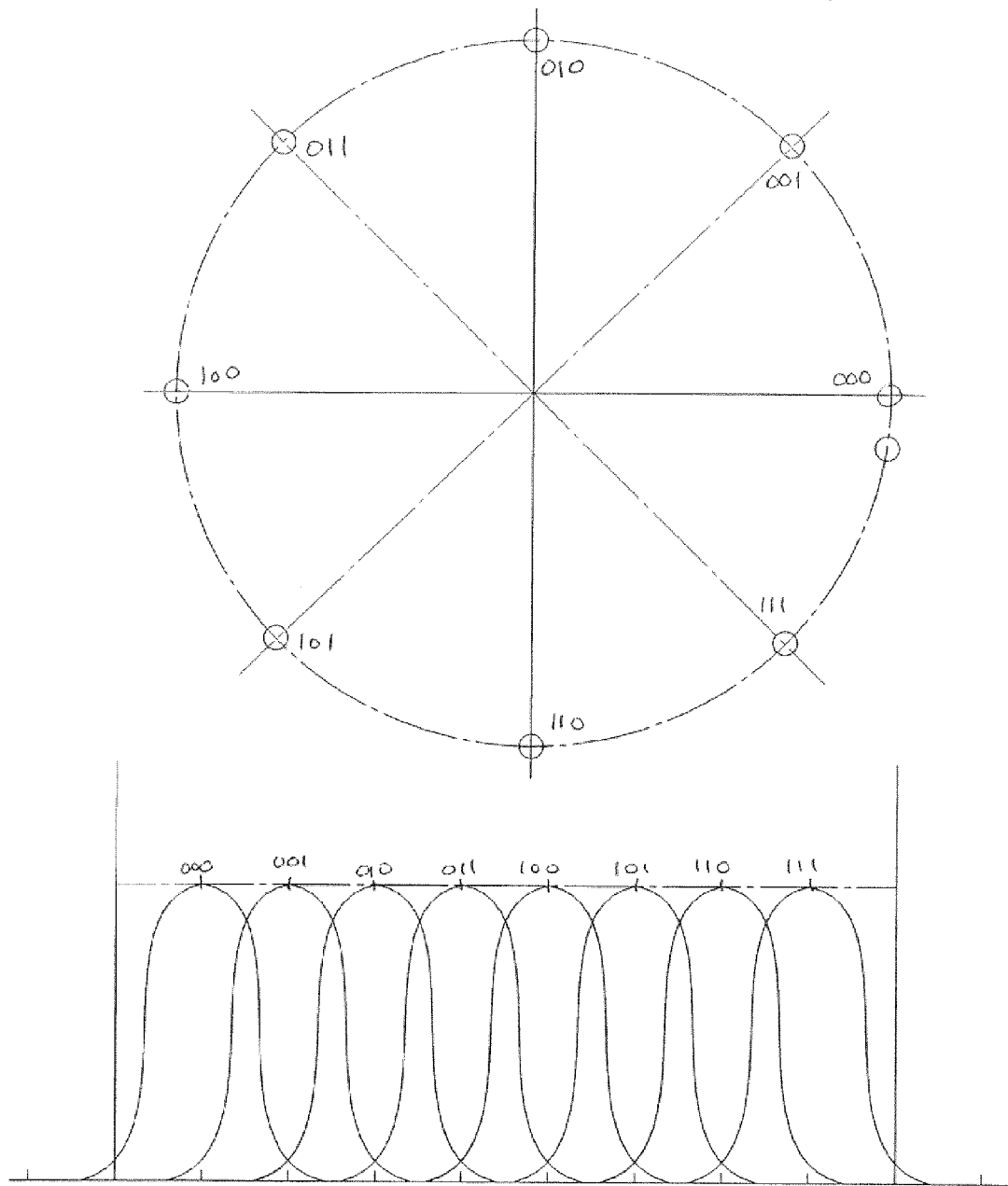
FIG. 1 is a phase diagram and waveform graph illustrating a known method of encoding data into mud pulses using PSK modulation (PRIOR ART).

It can be seen from the waveform graph in FIG. 12 that the separation between each pulse is significantly better than the pulse separation in the conventional single pulse height signal shown in FIG. 1. Such separation can be useful when conditions create a particularly noisy environment, which can make it more difficult for the surface receiving and processing equipment to distinguish one pressure pulse from another.

Conversely, such improved separation also allows the selected time period to be shortened thereby increasing the data rate, while still providing comparable if not better signal clarity compared to conventional PSK modulation using single height pressure pulses.

Referring now to FIG. 13 and according to a second embodiment, the memory 108 contains encoder program code executable by the encoder 105 to encode measurement data into a 4 bit, 16 state telemetry signal using a 16APSK modulation technique. This modulation technique provides double the data rate over the 8APSK modulation technique of the first embodiment shown in FIG. 12. In this second embodiment, the 16APSK modulation technique uses a 16 symbol set wherein each symbol 0000 to 1111 corresponds to a pressure pulse having a unique combination of one of eight distinct phases and one of two distinct amplitudes. That is, symbols 0000, 0010, 0100, 0110, 1000, 1010, 1100, and 1110 are assigned high amplitude pressure pulses at phases 0°, 45°, 90°, 135°, 180°, 225°, 270°, and 315° respectively, and symbols 0001, 0011, 0101, 0111, 1001, 1011, 1101, and 1111 are assigned low amplitude pressure pulses at phases 0°, 45°, 90°, 135°, 180°, 225°, 270°, and 315° respectively.

Figure 11A:
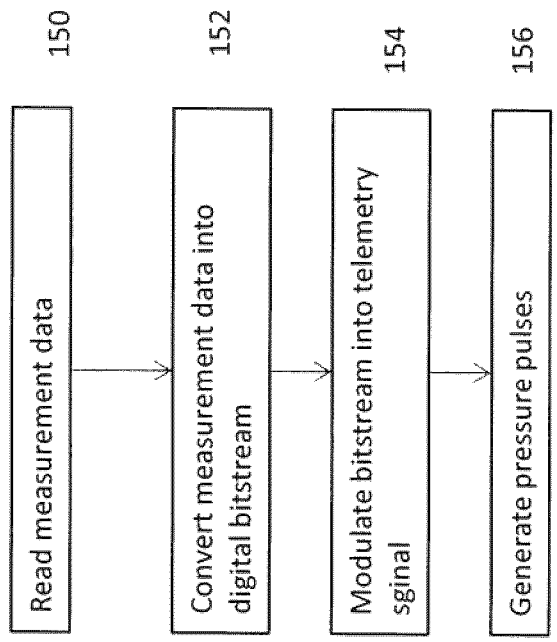
FIG. 11 (a) is a flow chart of steps for encoding telemetry data into a mud pulse signal using an 8APSK encoder and transmitting the signal to surface and FIG. 11(b) is a flow chart of steps for receiving and decoding the mud pulse signal into telemetry data using an 8APSK decoder according to one embodiment of the invention.

Referring now to FIG. 11(a), the encoder 105 executes the program code stored on the memory 108 to encode measurement data into a telemetry signal. The encoder first reads measurement data from the sensors, including the D&I sensor module 100 and drilling conditions sensor module 102 (step 150). This data is converted by the ADC into a digital bitstream (Step 152); the bitstream contains 3 bits when using the 8APSK modulation technique of the first embodiment, and 4 bits when using the 16APSK modulation technique of the second embodiment. Then, the bitstream is modulated using a suitable modulation technique to produce a telemetry signal (Step 154). Then the controller 106 sends motor control signals to operate the pulse generator motor to cause the pulse generator 30 to generate the pressure pulses 14, 15 representing this telemetry signal (Step 156).

Figure 11B:
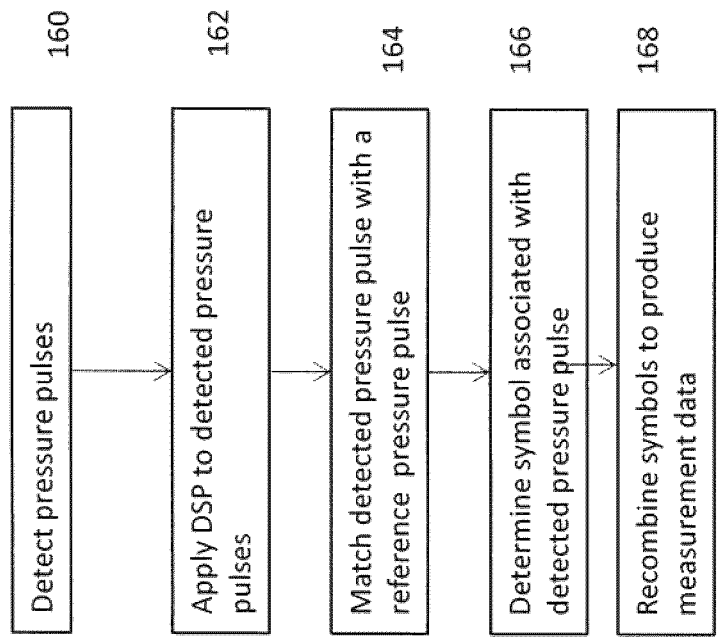

Referring now to FIG. 11(b), the surface pressure transducer 17 detects the pressure pulses 14, 15 and sends this analog telemetry signal to the ADC 122 to convert the waveform into a digital telemetry signal (Step 160). Then, the DSP 124 applies one or more digital signal processing operations to improve the clarity of the signal (Step 162). Then, the telemetry signal is fed into the decoder 126 which demodulates the telemetry signal by first locating the peak of each pressure pulse using a point-to-point multiplication and addition correlation technique as is known in the art; then, correlating each located peak to a local reference pressure pulse stored in memory and corresponding to the pressure pulses of the modulation technique used by the encoder 105. In other words, the memory stores a representation of each pressure pulse and its unique combination of amplitude and phase that was used to encode the measurement data, and the decoder 126 will match each detected pressure pulse with one of the reference pressure pulses (step 164). Once the detected pressure pulse has been correlated to a reference pressure pulse, the decoder 126 can determine the corresponding symbol associated with the detected pressure pulse (step 166). Each symbol is recombined into a data stream to recover the original measurement data for use by the operator (Step 168).

Although 8APSK and 16APSK modulation techniques are disclosed in these embodiments, other modulation techniques can also be used, such as 4APSK. Also, while the described embodiments use a dual pulse height fluid pressure pulse generator, pulse generators can be used which produce more than two different pulse heights, in which case the program code can be modified with modulation techniques that make use of the three or more different pulse heights.

While operating in the normal combined mode the MWD tool 20 can transmit telemetry data at a higher rate and/or with more clarity compared to a tool using only a single pulse height pulse generator. The MWD tool 20 can also be used in either the low amplitude pulse mode or high amplitude pulse mode when conditions dictate. For example, when there is failure with one stator window that is used to produce a high amplitude pressure pulse (reduced flow configuration), the controller 106 can switch operation of the pulse generator 30 from the normal combined mode to the low amplitude pulse mode, thereby avoiding operating the pulse generator 30 in the reduced flow configuration. As another example, when conditions exist that the low amplitude pressure pulse is not strong enough to transmit a telemetry signal to surface, the controller 106 can switch operation of the pulse generator 30 from the normal combined mode to the high amplitude pulse mode to generate pressure pulses that should be strong enough to reach surface. In another words, having a pulse generator with two different pulse heights provides the flexibility to transmit in one of two different single pulse height modes or in a two pulse height mode.

To be able to operate in the low or high amplitude pulse mode, the memory 108 is further encoded with program code executable by the encoder 105 and controller 106 to encode the measurement data into a mud pulse telemetry signal featuring only single pulse height pressure pulses. A suitable modulation technique such as PSK as shown in FIG. 1 can be used to modulate the telemetry signal when operating in such a single pulse height mode.

The controller 106 can read pressure measurements from the pressure transducer 34 or other pressure transducers (not shown) to determine whether to operate the pulse generator 30 in the normal combined mode, low amplitude pulse mode, or high amplitude pulse mode, or not at all. On start up, the controller 106 in an initiation step sends a control signal to the pulse generator motor to move the pulse generator 30 into each of the full flow, intermediate flow and reduced flow configurations and reads the pressures from the pressure transducer 34 in each configuration, namely: $P_{no\text{-}pulse}$ (to obtain a baseline measurement); $P_{low\text{-}pulse}$ and $P_{high\text{-}pulse}$. The controller 106 then determines the amplitudes of the pressure pulses in each of the low and high pulse height states by subtracting the read pressure measurements $P_{low\text{-}pulse}$ and $P_{high\text{-}pulse}$ from the baseline measurement $P_{no\text{-}pulse}$. The controller 106 then compares the amplitude of the measured low amplitude pressure pulse $P_{low\text{-}pulse}$ with the amplitude of a low amplitude reference pressure $P_{ref\text{-}low}$ stored in the memory 108; $P_{ref\text{-}low}$ can be selected to represent a sufficient amplitude that is expected to be required for the mud pulse telemetry signal to reach surface and be distinguishable by the surface operator. The controller 106 also compares the amplitude of the measured high amplitude pressure pulse $P_{high\text{-}pulse}$ with the amplitude of a high amplitude reference pressure $P_{ref\text{-}high}$ stored in the memory 108; $P_{ref\text{-}high}$ can be selected to represent an amplitude that is more than sufficient to transmit a telemetry signal to surface, and/or be so strong as to potentially damage or be detrimental to the drilling operation. The controller 106 then determines which pressure pulse modes are available to transmit telemetry, as follows: When the amplitudes of $P_{low\text{-}pulse}$ and $P_{high\text{-}pulse}$ are both greater than the amplitude of $P_{low\text{-}ref}$ and less then than the amplitude of $P_{high\text{-}ref}$ the controller 106 determines that the conditions are suitable to operate the pulse generator 30 in the normal combined mode, or in either the high amplitude pulse mode or the low amplitude pulse mode. When the amplitude of $P_{low\text{-}pulse}$ is below the amplitude of $P_{low\text{-}ref}$ and when the amplitude of $P_{high\text{-}pulse}$ is greater than the amplitude of $P_{low\text{-}ref}$ but less than the amplitude of $P_{high\text{-}ref}$, the controller 106 allows the pulse generator 30 to start operation only in the high amplitude pulse mode. Conversely, when the amplitude of $P_{high\text{-}pulse}$ is greater than the amplitude of $P_{high\text{-}ref}$ and when the amplitude of $P_{low}$ is higher than the amplitude of $P_{low\text{-}ref}$ and less than the amplitude of amplitude of $P_{high\text{-}ref}$ the controller 106 allows the pulse generator to start operation only in the low amplitude pulse mode. When neither the amplitudes of $P_{low\text{-}pulse}$ and $P_{high\text{-}pulse}$ meet the reference thresholds, then the controller 106 may not allow the pulse generator 30 to operate in any mode, and logs an error message onto the memory 108 or optionally sends the error message to surface by some other telemetry transmission means if available, e.g. by electromagnetic or acoustic telemetry if an electromagnetic or acoustic transmitter (neither shown) is part of the drill string.

When the controller 106 starts the pulse generator 30 in the combined mode, the controller sends control signals to the pulse generator motor to operate the pulse generator 30 between the intermediate and full flow configurations to generate low amplitude pressure pulses and between the reduced and flow configurations to generate high amplitude pressure pulses; the encoder 105 encodes the measurement data into a mud pulse telemetry signal using a modulation technique which makes use of the two different pulse amplitudes in the manner as previously discussed. The controller 106 can periodically or continuously read pressure measurements from the pressure transducer 34 and when the measured pressure of the low amplitude pressure pulse falls below the low amplitude reference pressure $P_{ref\text{-}low}$ the controller 106 will switch operation of the pulse generator to high amplitude pulse mode. Similarly, when the measured pressure of the high amplitude pressure pulse exceeds the high amplitude reference pressure $P_{ref\text{-}high}$ the controller 106 will switch operation of the pulse generator 30 to the low amplitude pulse mode.

When the pulse generator 30 is operating in either the low amplitude or high amplitude pulse modes to generate a telemetry signal, the controller can periodically or continuously read pressure measurements from the pressure transducer. When the read pressure measurements indicate that the pulse generator can be operated in the normal combined mode, the controller 106 can switch operation of the pulse generator 30 back to the combined mode to increase data rate transmission and/or improve signal clarity.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of the general concept.

What is claimed is:

1. A method for modulating a downhole telemetry signal using a fluid pressure pulse generator that generates pressure pulses of multiple pulse heights in a drilling fluid including a low amplitude pressure pulse and a high amplitude pressure pulse having an amplitude that is greater than the amplitude of the low amplitude pressure pulse, the method comprising:
    (a) generating the low and high amplitude pressure pulses and measuring and determining the amplitudes thereof;
    (b) converting measurement data into a bitstream comprising symbols of a selected symbol set;
    (c) only when the low and high amplitude pressure pulses have determined amplitudes that are between a low amplitude reference pressure and a high amplitude reference pressure, encoding the bitstream into a pressure pulse telemetry signal using a modulation technique that includes amplitude shift keying wherein each symbol of the selected symbol set is assigned a pressure pulse having a unique amplitude and that is selected from the low and high amplitude pressure pulses; and
    (d) generating pressure pulses in the drilling fluid corresponding to the telemetry signal.

2. The method as claimed in claim 1 wherein the modulation technique further includes phase shift keying and wherein each symbol of the selected symbol set is assigned a pressure pulse having a unique combination of amplitude and phase.

3. The method as claimed in claim 2 wherein the modulation technique is eight (8) state asymmetric phase shift keying (8APSK) and each pressure pulse has a unique combination of one of two different amplitudes and one of eight different phases.

4. The method as claimed in claim 2 wherein the modulation technique is 16 state asymmetric phase shift keying (16APSK) and each pressure pulse has a unique combination of one of two different amplitudes and one of 8 different phases.

5. The method as claimed in claim 2, further comprising detecting the pressure pulses at surface and decoding the pressure pulses into a digital bitstream by: correlating each detected pressure pulse with a reference pressure pulse corresponding to a pressure pulse used to encode the measurement data into the telemetry signal, then associating the detected pressure pulse with symbol bit that corresponds to the correlated reference pressure pulse.

6. The method as claimed in claim 5, further comprising digitizing the detected pressure pulses and applying a digital signal processing operation of the detected pressure pulses prior to decoding.

7. The method as claimed in claim 1, further comprising operating the pulse generator in a low amplitude pulse mode when the determined amplitude of the high amplitude pressure pulse exceeds the high amplitude reference pressure, the low amplitude pulse mode comprising generating only the low amplitude pressure pulses and encoding the bitstream into a pressure pulse telemetry signal using phase shift keying wherein each symbol of the selected symbol set is assigned a pressure pulse having a unique phase.

8. The method as claimed in claim 1, further comprising operating the pulse generator in a high amplitude pulse mode when the determined amplitude of the low amplitude pressure pulse is below the low amplitude reference pressure, the high amplitude pulse mode comprising generating only the high amplitude pressure pulses and encoding the bitstream into a pressure pulse telemetry signal using phase shift keying wherein each symbol of the selected symbol set is assigned a pressure pulse having a unique phase.

9. A downhole fluid pressure pulse telemetry apparatus comprising:
    (a) a fluid pressure pulse generator operable to generate pressure pulses having multiple pulse heights including a low amplitude pressure pulse and a high amplitude pressure pulse having an amplitude that is greater than the amplitude of the low amplitude pressure pulse;
(b) a motor subassembly comprising a pulse generator motor, a pulse generator motor housing that houses the motor, and a driveshaft extending from the motor out of the housing and coupling with the pulse generator,
(c) a pressure transducer positioned to measure a pressure of the drilling fluid flowing by the pulse generator; and
(d) an electronics subassembly comprising: a controller communicative with a downhole sensor to read measurement data, with the pressure transducer to read drilling fluid pressure measurements and with the motor to control operation of the pulse generator, and a memory having program code stored thereon and executable by the controller to perform a method comprising:
   (i) operating the motor to cause the pulse generator to generate the low and high amplitude pressure pulses, reading the pressure measurements and determining the amplitudes of the low and high amplitude pressure pulses;
   (ii) converting the measurement data into a bitstream comprising symbols of a selected symbol set;
   (iii) only when the low and high amplitude pressure pulses have determined amplitudes that are between a low amplitude reference pressure and a high amplitude reference pressure, encoding the bitstream into a pressure pulse telemetry signal using a modulation technique that includes amplitude shift keying wherein each symbol of the selected symbol set is assigned a pressure pulse having a unique amplitude and that is selected from the low and high amplitude pressure pulses; and
   (iv) operating the motor to cause the pulse generator to generate pressure pulses in the drilling fluid corresponding to the telemetry signal.

10. The apparatus as claimed in claim 9 wherein the modulation technique further includes phase shift keying and wherein each symbol of the selected symbol set is assigned a pressure pulse having a unique combination of amplitude and phase.

11. The apparatus as claimed in claim 10 wherein the pulse generator is operable to flow a drilling fluid in a full flow configuration to produce no pressure pulse having a first pulse height, a reduced flow configuration to produce the high amplitude pressure pulse having a second pulse height higher than the first pulse height, and an intermediate flow configuration to produce the low amplitude pressure pulse having a third pulse height between the first and second pulse heights.

12. The apparatus as claimed in claim 11 wherein the modulation technique is three bit, eight state asymmetric phase shift keying (8APSK) and each pressure pulse has a unique combination of one of two different amplitudes and one of eight different phases.

13. The apparatus as claimed in claim 11 wherein the modulation technique is four bit, sixteen state asymmetric phase shift keying (16APSK) and each pressure pulse has a unique combination of one of two different amplitudes and one of eight different phases.

14. The apparatus as claimed in claim 9 wherein the memory further comprises program code executable by the controller to operate the pulse generator in a low amplitude pulse mode when the determined amplitude of the high amplitude pressure pulse exceeds the high amplitude reference pressure, the low amplitude pulse mode comprising generating only low amplitude pressure pulses and encoding the bitstream into a pressure pulse telemetry signal using phase shift keying wherein each symbol of the selected symbol set is assigned a pressure pulse having a unique phase.

15. The surface receiver and signal processing apparatus as claimed in claim 14, further comprising an analog to digital converter (ADC) communicative with the pressure transducer and operable to digitize the detected pressure pulses, and a digital signal processor (DSP) communicative with the ADC and operable to apply a digital signal processing operation of the detected pressure pulses, and wherein the processor is communicative with the DSP to receive the digital bitstream.

16. The apparatus as claimed in claim 9 wherein the memory further comprises program code executable by the controller to operate the pulse generator in a high amplitude pulse mode when the determined amplitude of the low amplitude pressure pulse is below the low amplitude reference pressure, the high amplitude pulse mode comprising generating only high amplitude pressure pulses and encoding the bitstream into a pressure pulse telemetry signal using phase shift keying wherein each symbol of the selected symbol set is assigned a pressure pulse having a unique phase.

17. A surface receiver and signal processing apparatus comprising:
(a) a pressure transducer communicative with a drill site for detecting pressure pulses generated by the downhole fluid pressure pulse telemetry apparatus as claimed in claim 9; and
(b) a surface processor communicative with the pressure transducer and comprising a memory having program code executable by the surface processor to perform a method comprising: decoding the pressure pulses into a digital bitstream by correlating each detected pressure pulse with a reference pressure pulse corresponding to a pressure pulse used to encode the measurement data into the telemetry signal, then associating the detected pressure with the symbol that corresponds to the correlated reference pressure pulse.

* * * * *